United States Patent [19]

Cimock

[11] Patent Number: 5,289,355
[45] Date of Patent: Feb. 22, 1994

[54] PORTABLE LIGHTED MICROPHONE

[75] Inventor: Benjamin J. Cimock, Altamonte Springs, Fla.

[73] Assignee: I & K Trading, Vienna, Va.

[21] Appl. No.: 2,311

[22] Filed: Jan. 8, 1993

[51] Int. Cl.$^5$ .................................................. F21V 33/00
[52] U.S. Cl. .................................... 362/86; 362/109; 362/253; 362/276
[58] Field of Search ............... 362/109, 253, 86, 811, 362/276, 802; 381/91, 122, 168; 315/16, 363

[56] References Cited

U.S. PATENT DOCUMENTS

| 2,466,000 | 4/1949 | Brown | 362/253 |
| 3,005,905 | 10/1961 | Libson | 362/86 |
| 3,205,755 | 9/1965 | Sklar | 362/276 |
| 4,256,009 | 3/1981 | Verduin et al. | 362/811 |
| 4,358,754 | 11/1982 | Young et al. | 362/811 |
| 5,136,487 | 8/1992 | Schmidt | 362/253 |

Primary Examiner—Richard R. Cole
Attorney, Agent, or Firm—Blum Kaplan

[57] ABSTRACT

A portable lighted microphone formed in a configuration which outputs light, sound and color simultaneously. The lighted microphone includes a hand-held housing having a microphone assembly for detecting an external voice sound. A speaker assembly is positioned in the housing and is coupled to the microphone for outputting the external voice sound. A light source is mounted in the housing and is coupled to the microphone for emitting a beam of light. A modulating circuit within the housing is coupled to the microphone and the light source for modulating the beam of light in time sequence with the voice sound received by the microphone.

20 Claims, 4 Drawing Sheets

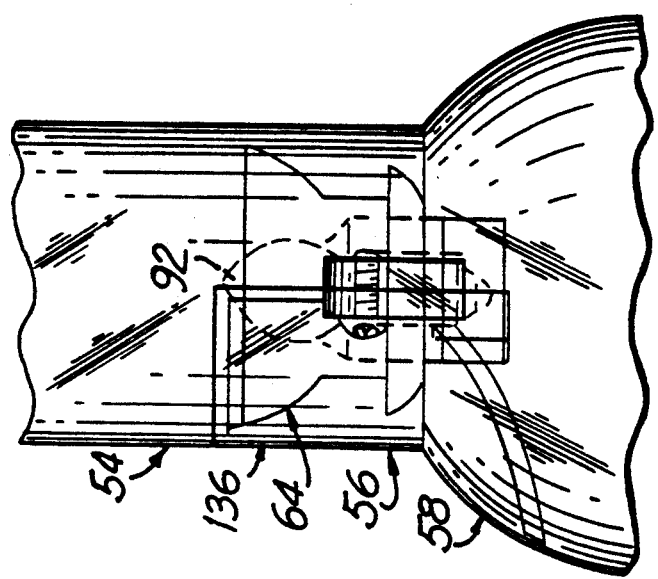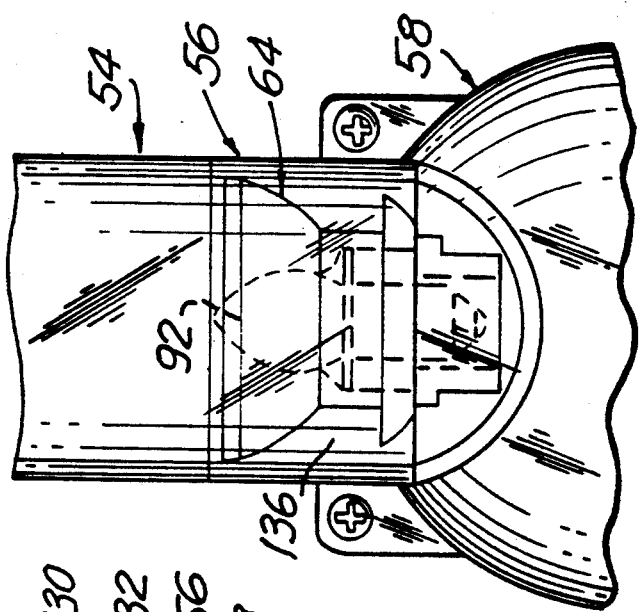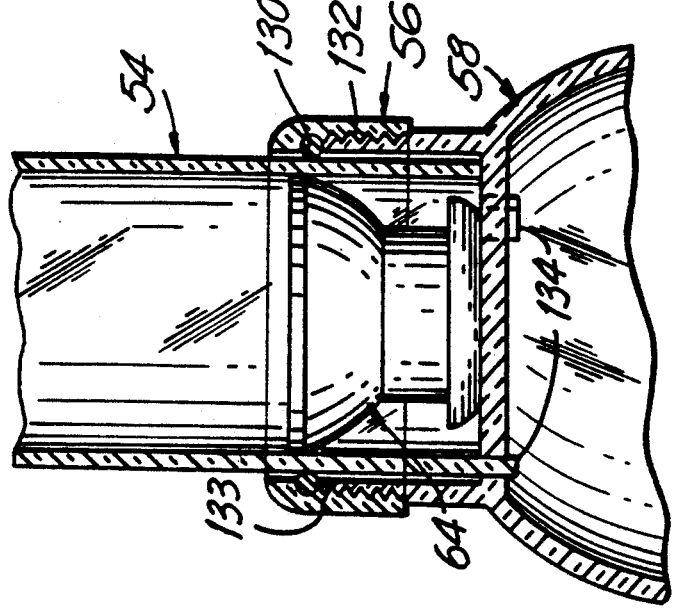

PORTABLE LIGHTED MICROPHONE

BACKGROUND OF THE INVENTION

This invention is directed to a lighted microphone and, in particular, to a portable lighted microphone which creates amplified sound, light and color to provide enhanced play value.

Toy microphones and flashlights have taken many shapes, forms and styles over the years. In fact, toy flashlights have existed with strobing lights to provide certain types of play value, while microphones have existed in an attempt to simulate a concert-like environment by the user. However, these microphones are not typically portable and a child cannot easily manipulate and use the device with one hand. Rather, the toy microphones are tall and bulky. Moreover, with the proliferation of wireless remote microphones in the entertainment business, children want to imitate their favorite performers. Although flashlights and microphones individually can provide considerable enjoyment for a child, on their own they do not offer a variety of different elements to provide longlasting enjoyment. In addition, applicant is not aware of any device which includes a microphone with a flashlight with a strobing feature to provide and offer distinct play value.

Accordingly, the present invention provides a lighted microphone which has high technology-like special effects. More specifically, the lighted microphone of the present invention includes means for creating amplified sound, light and a variety of colors while producing a rapidly blinking beam of light. Accordingly, a lighted microphone provides enhanced play value.

SUMMARY OF THE INVENTION

Generally speaking, in accordance with the instant invention, a portable lighted microphone assembly is provided for outputting light, sound and color. The lighted microphone includes a hand-held housing. A microphone is provided on the housing for detecting an external voice sound positioned in the housing. A speaker is positioned in the housing and is coupled to the microphone for outputting the external voice sound. A light source is releasably mounted within the housing and coupled to the microphone for emitting a beam of light. A modulating circuit is provided and is coupled to the microphone and light source for modulating the beam of light in time sequence with the voice sound received by the microphone.

In an exemplary embodiment, the housing is provided with a first end and a second end opposite the first end. The microphone is positioned in the first end of the housing, while the power supply is positioned at the second end of the housing. The power supply is coupled to the microphone, the speaker, the light source and modulating circuit. The light source is releasably mounted between the power supply and the microphone and the housing. At the same time, the speaker is positioned between the light source and power supply in the housing. The modulating circuit is essentially positioned in the housing between the light source and the speaker. A tubular neck is provided and is positioned between the light source and the microphone. The neck includes diffraction material therein for diffracting the beam of light in a plurality of directions. The diffracting material is formed of a variety of colors.

A circuit for outputting light and sound from the lighted microphone is also provided. The circuit includes a power supply for supplying power to the circuit. A microphone is provided for detecting an external voice sound and is coupled to the power supply. An amplifying and control circuit is positioned in the circuit for amplifying the external voice sound received by the microphone. A speaker is provided and is coupled to the amplifying control circuit for outputting the external voice sound. A light source is coupled to the amplifying and control circuit for emitting a beam of light. Finally, modulating circuitry is coupled to the amplifying control circuit and the light source means for modulating the beam of light in time sequence with the voice sound received by the microphone.

Accordingly, it is an object of the instant invention to provide an improved amusement device in the form of a portable lighted microphone having a light strobing feature.

A further object of the invention is to provide a lighted microphone which can provide rapidly blinking light in time sequence to the inputted voice sound to create a futuristic effect.

Still a further object of the invention is to provide a lighted microphone which outputs sound, light and color simultaneously.

Still other objects and advantages of the invention will in part be obvious and will in part be apparent from the specification.

The invention accordingly comprises the features of construction, combination of elements and arrangement of parts which will be exemplified in the constructions hereinafter set forth and the scope of the invention will be indicated in the claims.

BRIEF DESCRIPTION OF THE DRAWINGS

For a fuller understanding of the invention, reference is had to the following description taken in connection with the accompanying drawings in which:

FIG. 4 is an enlarged sectional view of a portion of the lighted microphone of FIG. showing the light assembly in accordance with an alternative embodiment of the invention;

FIG. 5 is a front plan sectional view of the light assembly of the lighted microphone of FIG. 1 in accordance with a second alternative embodiment of the invention;

FIG. 6 is a side view of the light assembly of FIG. 5; and

DETAILED DESCRIPTION OF THE PREFERRED EMBODIMENTS

Figure 1:
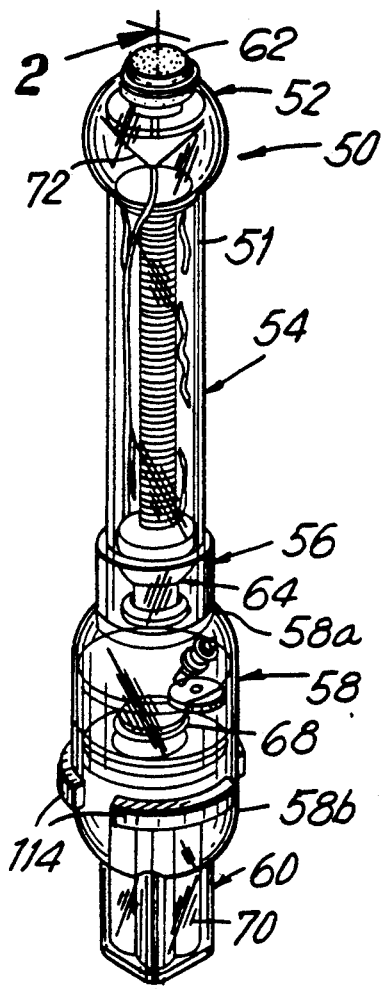
FIG. 1 is a perspective view of a portable lighted microphone constructed in accordance with the preferred embodiment of the invention.
Figure 3:
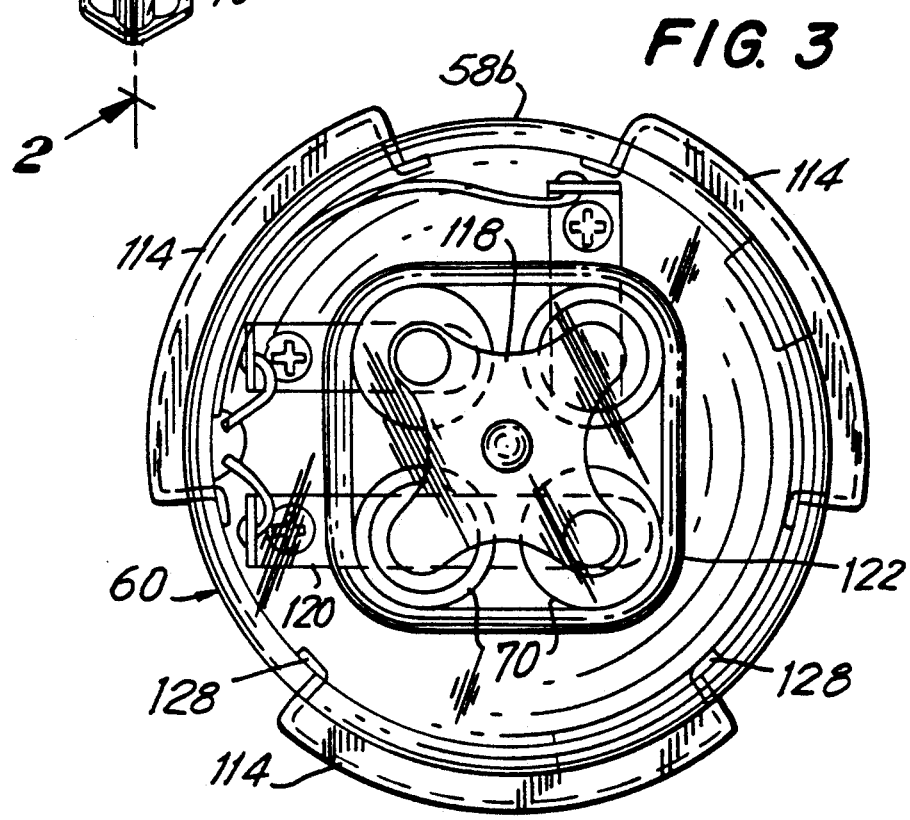
FIG. 3 is an enlarged sectional view taken along line 3—3 of FIG. 2.
Figure 2:
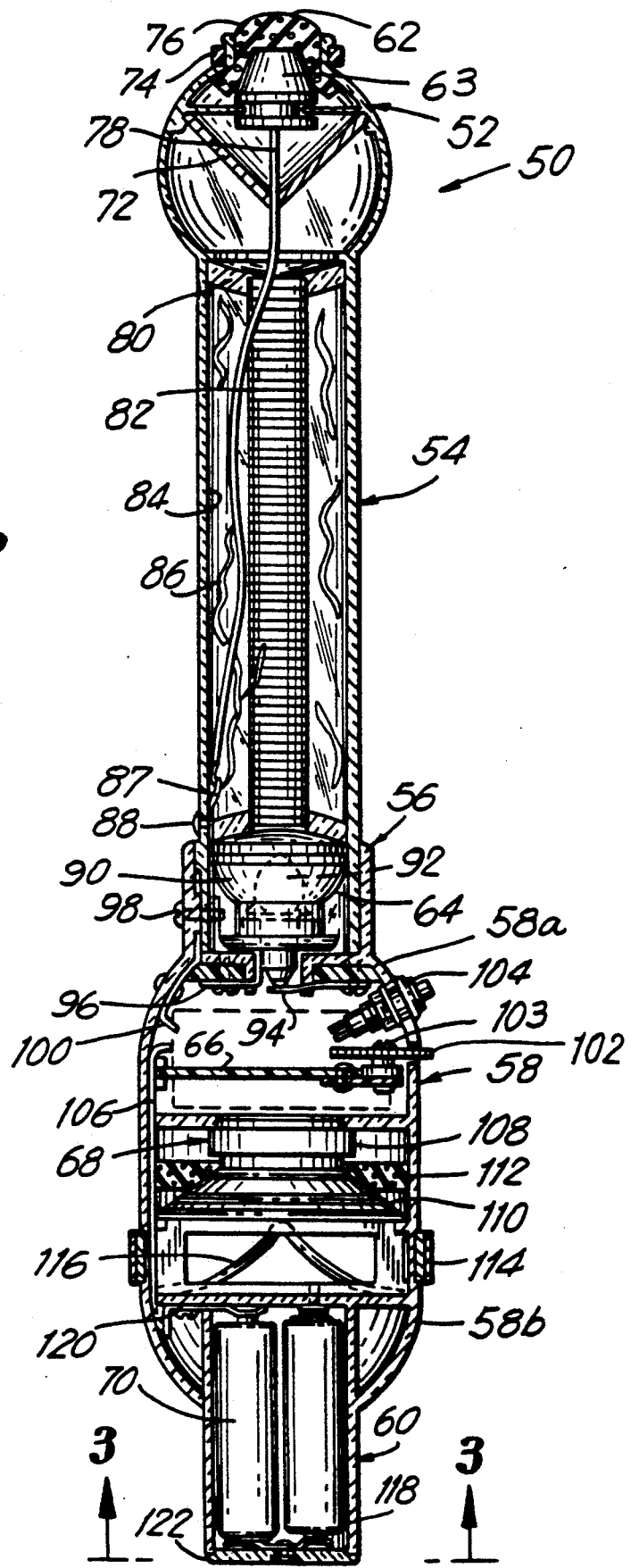
FIG. 2 is an enlarged sectional view taken along line 2—2 of FIG. 1.

Reference is first made to FIGS. 1-3 wherein a portable lighted microphone, generally indicated as 50, is depicted. Microphone 50 includes a hand-held housing 51 having spherical microphone section 52 coupled to a cylindrical neck 54. Cylindrical neck 54 is joined to a light housing section 56 which is wider than neck 54. A main housing section 58 is provided and includes a first end 58a coupled to light housing 56 and a second end 58b coupled to a battery storage housing section 60. Together, these elements form a lightweight and compact lighted microphone which can be easily held by children and adults alike. The user holds the device by means of the main housing section 58. Based on this configuration, the user is able to hold the device in one hand to simulate a concert-like environment wherein microphone section 50 is pointed upwards towards the user's head so that it has the appearance of an actual cordless microphone. At the same time, a child can play with the toy so that the lights flash and different colors are reflected and diffracted from lighted microphone 50 with enhanced play value.

In the preferred embodiment, microphone housing 51 is formed of a clear polycarbonate material so that all the internal components are visible to the user. In an alternative embodiment, the clear polycarbonate could have a color tint to further enhance the play value of the device. Moreover, different components can be made of a combination of opaque polycarbonate or chrome plating to have a more complementary effect with the polycarbonate portions.

Referring specifically to FIG. 2, microphone housing section 52 is formed with a microphone assembly 62. Microphone assembly 62 includes a microphone 63 having a foam cap 76 to protect microphone 63 when in use. Moreover, foam cap 76 aids in the prevention of feedback of device 50. In addition, a chrome reflector 72 is positioned below microphone 63 to further deflect the sound from entering the system and causing any feedback therein. Microphone 63 is connected to a circuit board 66, which will be described in greater detail below, by a microphone wire 78. In a preferred embodiment, microphone wire 78 is a metal shielded wire.

Microphone wire 78 is threaded through neck 54. Neck 54 serves as the light emitting portion of the device. Different color diffracting materials are positioned in neck 54 to enhance the play value of device 50. More specifically, a first diffraction material 82 is inserted in the center portion of neck 54. A second diffraction material 84 is positioned against the inside surface of neck 54. In a preferred embodiment, second diffraction material 84 is a combination of print treated polyester partially metabolized which is corona treated with no metal overcoat. Finally, crystal fibers 86 are interspersed between diffraction materials 82 and 84. Crystal fibers 86 are formed with a variety of colors to create a greater colored effect when the light shines through neck 54.

Neck 54 is inserted into an opening of light housing section 56. Light housing 56 forms a holding portion for light assembly 64. Neck 54 is mounted to light housing 56 by means of screws 98. In addition, microphone wire 78 is connected to contact lead 87 which is mounted to the inner side of neck 54 by means of rivet 88. Contact leads 87 are then mounted to microphone contacts 100 which lead to circuit board 66 as will be described in greater detail below.

Light assembly 64 includes a reflector 90. Reflector 90 includes an inwardly radially disposed wall having an opening therein for receiving a flashlight bulb 92. In a preferred embodiment, lightbulb 92 is a PR4 3 volt light source. In this construction, flashlight bulb 92 is positioned so that it contacts positive terminal lead 94 which then leads towards circuit board 66. A negative terminal lead 96 is provided on the side portion of flashlight bulb 92 for forming a connection therebetween and leads towards circuit board 66. Positive terminal lead 94 and negative terminal lead 96 will be described in greater detail below with respect to the circuitry of device 50.

A single on/off switch and volume rheostat 102 is provided and is mounted on the side portion of main housing section 58. Volume rheostat 102 is a disc-like switch which rotates around a screw 103. Volume rheostat 102 is also connected to circuit board 66. A strobe speed button 104, also connected to circuit band 66, is positioned on main housing 56. Strobe speed button 104 serves as a strobe modulator for flashlight bulb 92 to rapidly switch flashlight bulb 92 between an on and off state. Volume rheostat 102 and strobe speed button 104 are conveniently positioned on housing section 58 so that when the device is being held, the user can easily manipulate the two switches to control the operation thereof.

Main housing section 58 is further provided with a speaker assembly 68. Speaker assembly 68 is formed with a magnet 108 and a speaker cone 110. Speaker assembly 68 is surrounded by a gasket 112 preferably formed of foam to hinder the sound from moving upward towards microphone 63, and thereby prevent feedback. Sound outputted from speaker cone 110 is deflected by sound dispersal horn 116 through speaker screens 114. Speaker screens 114 are locked to main housing 58 through flanges 28 positioned on each side thereof. In a preferred embodiment, three speaker screens are provided surrounding the outer periphery of main housing 58 as shown in FIG. 3.

Referring specifically to FIGS. 2 and 3, a battery storage portion 60 is provided with four batteries 70 of 1.5 volts each. Batteries 70 are surrounded by battery contact plates 118 and 120 for making electrical contact with batteries 70. Contact plates 118 and 120 are connected to circuit board 66 through wires 106. Batteries 70 are locked and stored in battery storage portion 60 by means of a cap 122 which interlocks with the bottom end of battery storage portion 60.

Lighted microphone 50 creates amplified sound, light and color. Based on the circuit which will be described with specific reference to FIG. 7, the light is modulated in time sequence to the voice and/or music. Strobe speed button 104 doubles the frequency of flashlight bulb 92 when depressed and held. The audio input to microphone 63 modulates flashlight bulb 92 on a power circuit with the strobe which guarantees a constant modulation of the light source.

When a child holds lighted microphone 50, and talks into microphone 63, sound is outputted through speaker screens 114 by means of speaker assembly 68. At the same time, the audio received by the microphone modulates flashlight bulb 92 so that it acts as a strobe light. The strobing light diffracts off of first diffraction material 82, second diffraction material 84 and crystal fibers 86 to output a variety of colored lights from neck 54 of lighted microphone 50. Moreover, volume rheostat 102 controls the volume output from the microphone, while strobe speed button 104 acts as an override for modulating bulb 92. More specifically, if the child wants to create a strobe light, the child merely depresses strobe speed button 104 to control a rapid blinking of flashlight bulb 92 irrespective of the audio received through microphone 63.

Reference is now made to FIGS. 4, 5 and 6 which depict two alternative embodiments for mounting light assembly 64 into light housing 56. FIG. 4 depicts a first alternative embodiment for mounting light assembly 64.

More specifically, light housing 56 is provided with an o-ring 130 and a threaded portion 132, while neck 54 is provided with a threaded portion 133 for being received by threads 132 to lock neck portion 54 to light housing 56. Moreover, positioning tabs 134 are provided for locking light assembly in place once neck 54 joins light housing 56.

Referring now to FIGS. 5 and 6, a second alternative embodiment is shown for housing light assembly 64. FIG. 5 represents a front view, while FIG. 6 represents a side view. In this construction, a panel 136 is provided which is removable to create access to the light assembly 64. When flashlight bulb 92 requires changing, panel 136 is removed from light housing 56 so that flashlight bulb 92 can be easily changed.

Figure 7:
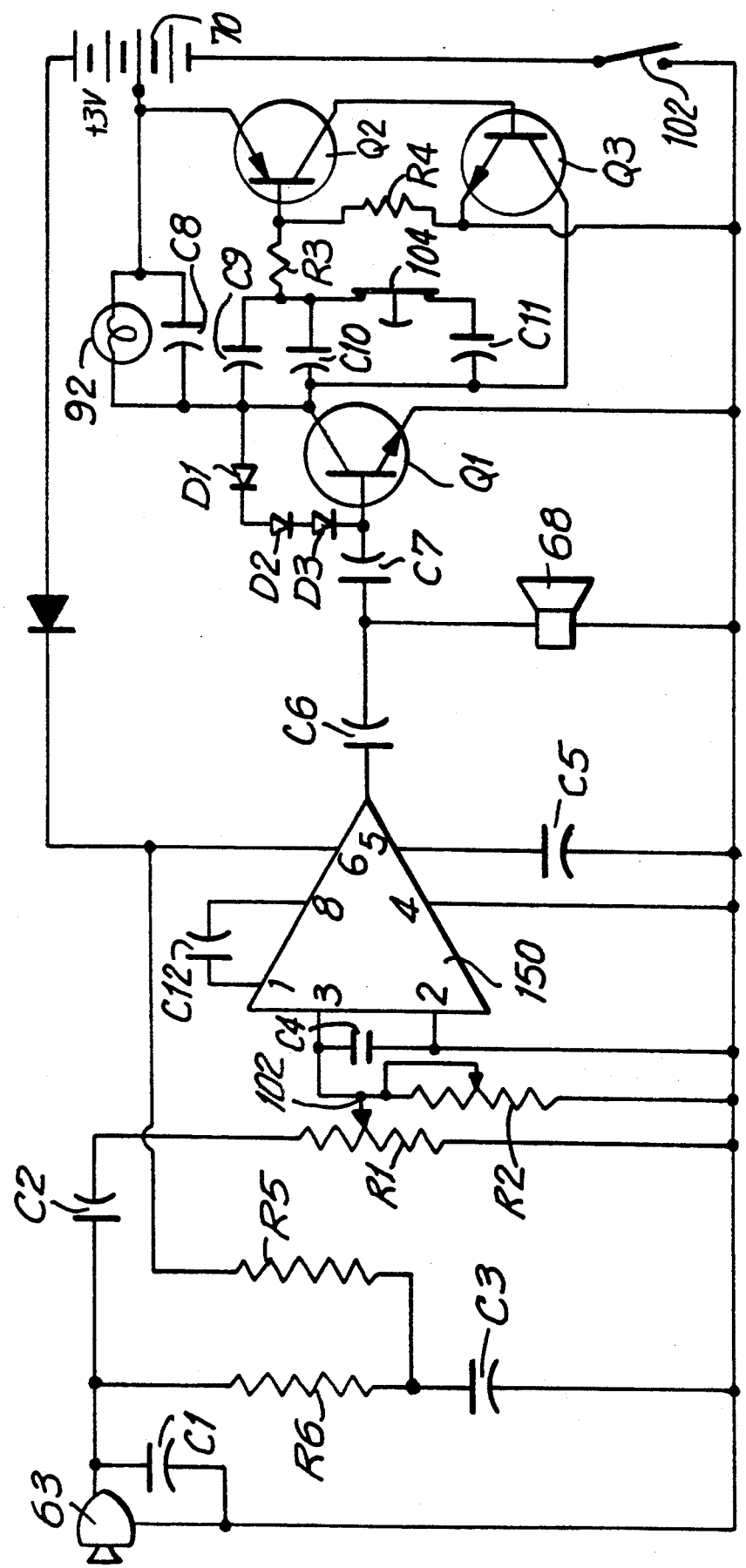
FIG. 7 is a schematic circuit diagram of the circuitry of the present invention.

Reference is now made to FIG. 7 which is a schematic circuit diagram of the circuit of lighted microphone 50. The purpose of this circuitry is to produce amplified sound to a loudspeaker, modulate the intensity of a lamp bulb proportional to the rate and level of the audio input and produce lamp flashes at a selective repetitive rate in addition to the rate produced by the audio input signals. Speech audio is received by microphone 63 and is coupled to audio amplifier 150 through capacitor C2. In addition, a capacitor C1 is in parallel with microphone 63. A resistor R6 is provided and is in series with a capacitor C3 which together are in parallel with both capacitor C1 and microphone 63. The audio level at the output of amplifier 150 is controlled by resistor R1 and switch 102. The combination of resistor R1 and switch 102 form a combination of a volume control and power switch. Variable resistor R2 is adjusted to control the maximum output level to prevent audio feedback when the volume control resistor R1 and switch 102 are set at the full clockwise position. The amplified audio is coupled from amplifier 150 to loudspeaker 68 through a capacitor C6. The gain of amplifier 150 can be adjusted by inserting a fixed value resistor in series with capacitor C12.

Lamp intensity modulation operates in the following manner. A capacitor C7 is coupled to the amplifier 150 through capacitor C6 and to transistor Q1. As the audio peak voltage level increases, transistor Q1 is "turned on" proportional to the amount of audio input received to allow a varying current to flow through light bulb 92. The level of the variations in current flow is dependent upon the level and the frequency of the audio input to microphone 63. One terminal of lightbulb 92 is connected to 3 volt connection of the power supply 70, while the second terminal is connected to transistor Q1. Therefore, as transistor Q1 is turned on, the terminal of lightbulb 92 not connected to the 3 volt power source is connected to ground, thereby producing light level variations. Moreover, diodes D1, D2 and D3 further control the flow of current in the lamp intensity modulation circuitry.

In addition to being modulated by the audio input, lightbulb 92 is also flashed at a periodic rate by the circuitry of capacitor C9, capacitor C10, capacitor C11, resistor R3, resistor R4, transistor Q2 and transistor Q3. These components form a combination of a low frequency oscillator and lamp switch. Resistors R3 and R4 and capacitors C9-C11 form a time constant circuit which determines the time required to cause transistor Q2 to turn on. When transistor Q2 is turned on, it activates transistor Q3 to an "on" state which also grounds the low voltage side of lightbulb 92 and produces light. When transistor Q3 is in the "on" state, it discharges capacitors C9-C11 causing transistor Q2 to turn "off". In turn, this causes transistor Q3 to turn again to the "off" state and thereby extinguishing lightbulb 92. This process is repeated at a rate determined by the value selected for resistors R3 and R4 and capacitors C9-C11. When switch 104 is opened, capacitor C11 is removed from the circuit allowing the flash to occur at a faster rate, since less time is required to discharge the current stored in capacitors C9 and C10.

The circuitry disclosed in FIG. 7 uses four AA batteries for power. Moreover, the full 6 volts are used for the microphone via circuit and the audio amplifier integrated circuit, but only two AA batteries or 3 volts are required for lightbulb 92. A lightbulb PR4 is used due to the fact that it drains less current than most other flashlight bulbs. More specifically, the PR4 draws approximately 270 ma compared to 500 ma for most other standard flashlight bulbs. In the preferred embodiment, microphone 63 is an electret type, amplifier 150 is an integrated circuit model number LM386N and speaker 68 is an 8 ohm device two and one quarter (2¼) inches in diameter. In addition, transistor Q1 is a 2N4124, transistor Q2 is a 2N4126 and transistor Q3 is also a 2N4124. The values of the other resistors, capacitors and diodes in the system depend on a the desired output and are not critical to the operation and function of the device. These features include the amount of output, the rate of flash, cost and availability.

The instant invention is characterized by a lighted microphone which is capable of imparting distinct types of play value. More specifically, a portable hand held microphone and speaker arrangement is provided which can emit a rapidly blinking light modulated in response to the audio input. Further, the invention provides a strobing switch which can create a futuristic element to the device by at least doubling the blinking frequency of the light source. Finally, the device in a preferred embodiment, is made of a clear polycarbonate material so that the internal features and elements of the lighted microphone can be viewed by the user and thereby enhance the play value of the device.

It will thus be seen that the objects set forth above, among those made apparent from the preceding description are efficiently attained and, since certain changes may be made in the above constructions without departing from the spirit and the scope of the invention, it is intended that all matters contained in the above description or shown in the accompanying drawings shall be interpreted as illustrative and not in a limiting sense.

It is also understood that the following claims are intended to cover the generic and specific features of the invention herein described and all statements from the scope of the invention which, as a matter of language, might be said to fall therebetween.

What is claimed is:

1. A portable lighted microphone comprising a handheld housing, microphone means supported on said housing for receiving an external voice sound, speaker means positioned on said housing and coupled to said microphone means for outputting said external voice sound, light source means supported on said housing and coupled to said microphone means for emitting light, and modulating means coupled to said microphone means and said light source means for modulating said light in accordance with said voice sound received by said microphone means.

2. The lighted microphone of claim 1, wherein said housing includes a first end and a second end opposite said first end, said microphone means being positioned at the first end of said housing, and said light source means being positioned intermediate said first and second ends.

3. The lighted microphone of claim 2, wherein said housing includes a power supply holding section positioned at the second end of said housing.

4. The lighted microphone of claim 3, wherein said light source means is essentially mounted between said power supply holding section and said microphone means in said housing.

5. The lighted microphone of claim 4, wherein said speaker means is positioned intermediate said light source means and said power supply holding section in said housing.

6. The lighted microphone of claim 5, wherein said modulating means is positioned intermediate said light source means and said speaker means in said housing.

7. The lighted microphone of claim 1, wherein said housing includes a tubular neck extending intermediate said light source means and said microphone means.

8. The lighted microphone of claim 7, further including a gripping means positioned between said light source means and said power supply holding section for holding the device with one hand of a user, said gripping means having a diameter greater than said tubular neck.

9. The lighted microphone of claim 8, further including switching means coupled to said microphone means, said speaker means, said light source means and said modulating means for controlling the output of said speaker means.

10. The lighted microphone of claim 9, further including strobe means coupled to said light source means for increasing the output of said light so that said light source means more rapidly switches between an on state and an off state to create a strobing effect.

11. The lighted microphone of claim 10, wherein said switching means and said strobe means include controls which are positioned on said gripping means for manipulation by the fingers of a user.

12. The lighted microphone of claim 7, wherein said neck includes diffraction material therein for diffracting the light from said light source means in a plurality of directions.

13. The lighted microphone of claim 12, wherein said diffraction material is formed in a variety of colors.

14. The lighted microphone of claim 1, further including switching means coupled to said microphone means, said speaker means, said light source means and said modulating means for controlling the output of said speaker means.

15. The lighted microphone of claim 1, further including strobe means coupled to said light source means for increasing the output of said light so that said light source means more rapidly switches between an on state and an off state to create a strobing effect.

16. The lighted microphone of claim 1, wherein said housing is formed of a clear polycarbonate material.

17. The lighted microphone of claim 16, wherein said polycarbonate material has a color tint.

18. A portable lighted microphone comprising a hand held unitary housing and a circuit for outputting light and sound supported by said housing, said circuit including a microphone for detecting an external voice sound, amplifying and control means coupled to said microphone for amplifying the external voice sound received by said microphone, a speaker coupled to said amplifying and control means for outputting said amplified external voice sound, light source means coupled to said amplifying and control means for emitting a beam of light, and modulating means coupled to said amplifying and control means and said light source means for modulating said beam of light in accordance with said voice sound received by said microphone.

19. The portable lighted microphone of claim 18, further including a first switching means coupled to said light source means for increasing the rate at which the light source means for increasing the rate at which the light source means switches between an on state and an off state to create a strobing effect.

20. The portable lighted microphone of claim 19, further including a second switching means coupled intermediate said microphone and said amplifying and control means and a power supply means for switching between an on condition and an off condition and controlling the output level of said external voice sound.

* * * * *